United States Patent
Long et al.

(10) Patent No.: US 11,127,018 B2
(45) Date of Patent: Sep. 21, 2021

(54) SECURE ACCESS-BASED RESOURCE DELEGATION

(71) Applicant: NCR Corporation, Duluth, GA (US)

(72) Inventors: Justin Long, West Jordan, UT (US); Joseph A. Hoyal, Highland, UT (US); John C. Maughan, Taylorsville, UT (US); Eric Jeffery Woolsey, II, Draper, UT (US)

(73) Assignee: NCR Corporation, Atlanta, GA (US)

( * ) Notice: Subject to any disclaimer, the term of this patent is extended or adjusted under 35 U.S.C. 154(b) by 491 days.

(21) Appl. No.: 15/475,287

(22) Filed: Mar. 31, 2017

(65) Prior Publication Data

US 2018/0285871 A1 Oct. 4, 2018

(51) Int. Cl.
*G06Q 20/40* (2012.01)
*G06Q 20/32* (2012.01)
*G06Q 20/38* (2012.01)

(52) U.S. Cl.
CPC .......... *G06Q 20/405* (2013.01); *G06Q 20/32* (2013.01); *G06Q 20/3276* (2013.01); *G06Q 20/385* (2013.01); *G06Q 20/389* (2013.01); *G06Q 20/38215* (2013.01)

(58) Field of Classification Search
CPC .. G06Q 20/405; G06Q 20/389; G06Q 20/385; G06Q 20/38215; G06Q 20/3276; G06Q 20/3274; G06Q 20/32; H04W 12/0804; H04W 12/00522; H04W 12/0802; H04L 63/10
See application file for complete search history.

(56) References Cited

U.S. PATENT DOCUMENTS

| | | | |
|---|---|---|---|
| 10,467,604 B1 * | 11/2019 | Dorsch | G06Q 20/3223 |
| 2013/0024364 A1 * | 1/2013 | Shrivastava | G06Q 20/38 705/39 |
| 2013/0085817 A1 * | 4/2013 | Pinkus | G06Q 30/0207 705/14.1 |
| 2013/0339188 A1 * | 12/2013 | Mohamed | G06Q 20/027 705/26.41 |
| 2016/0342783 A1 * | 11/2016 | Yates | G06F 21/34 |
| 2017/0041296 A1 * | 2/2017 | Ford | H04L 63/0421 |
| 2017/0223005 A1 * | 8/2017 | Birgisson | H04L 63/083 |
| 2017/0300907 A1 * | 10/2017 | Shanmugam | G06Q 20/405 |
| 2018/0341935 A1 * | 11/2018 | Lindfeldt | G06Q 20/204 |

FOREIGN PATENT DOCUMENTS

WO    WO-2015157720 A2 * 10/2015 ........... H04L 9/3242

* cited by examiner

*Primary Examiner* — A. Hunter Wilder
(74) *Attorney, Agent, or Firm* — Schwegman, Lundberg & Woessner (57) ABSTRACT

A secure token defines use-based access restrictions to a first user resource. The secure token is delegated to a second user. The second user redeems the secure token for access to the first user's resource. The access during redemption is constrained by the use-based access restrictions defined by the first user.

7 Claims, 5 Drawing Sheets

FIG. 1A

EXAMPLE SECURE TOKEN USE-BASED RESTRICTIONS OR CAVEATS

SECURE ACCESS-BASED RESOURCE DELEGATION

BACKGROUND

Consumers are embracing technology to perform a variety of transactions with enterprises. Mobile phones have allowed consumers to perform transactions on the go with enterprises, such transactions used to be reserved for desktop computers having largely wired connections to the Internet for accessing the retailer-based systems.

However, consumers are still substantially limited in mobile-based transactions where they lack access to currency (cash). Currency is not portable and for the most part has to be in the physical possession of the consumer for use. A consumer may have access to accounts that have cash or that extend cash, such as bank accounts and credit card accounts, but access to these accounts require consumer identification and credential verification.

Consumers will not typically give a third-party access to these accounts because the third-party would have unfettered access to the entire account balance of the consumer or the entire available credit line available to the consumer. This means when consumers or small businesses need a third-party to perform some service on their behalf, the consumer needs to provide that third-party cash or a check (which needs to clear before funds are available to the third party and therefore may be untimely for a given situation of the consumer).

Additionally, the security associated with providing a third-party cash is inherently problematic. For example, the third-party: may use the cash on something other than the service that the consumer bargained for, may have the cash stolen, or may lose the cash. In still another situation, the third-party may allege that the cash was not received or was not the full amount needed and without a receipt, the consumer may be in a situation where resolution depends on whether someone believes the consumer or the third party as to what whether the cash was provided or was provided in the proper amount that the third-party needed to fulfill the third-party's agreed to obligation.

Accordingly, even though technology has substantially advanced in recent years, a consumer's ability to securely and timely engage third-parties for services in a non-repudiated and audited manner are still substantially constrained in the industry.

SUMMARY

In various embodiments, methods and a Point-Of-Sale (POS) terminal for secure access-based resource delegation.

According to an embodiment, a method for secure access-based resource delegation is provided. An interface is provided to a device. Use-based restrictions for access to a resource are received through the interface from a user operating device. A secure token is created having the use-based restrictions. Next, the secure token is delivered to the user for subsequent delegation and redemption of the secure token by a second user.

DETAILED DESCRIPTION

Figure 1A:
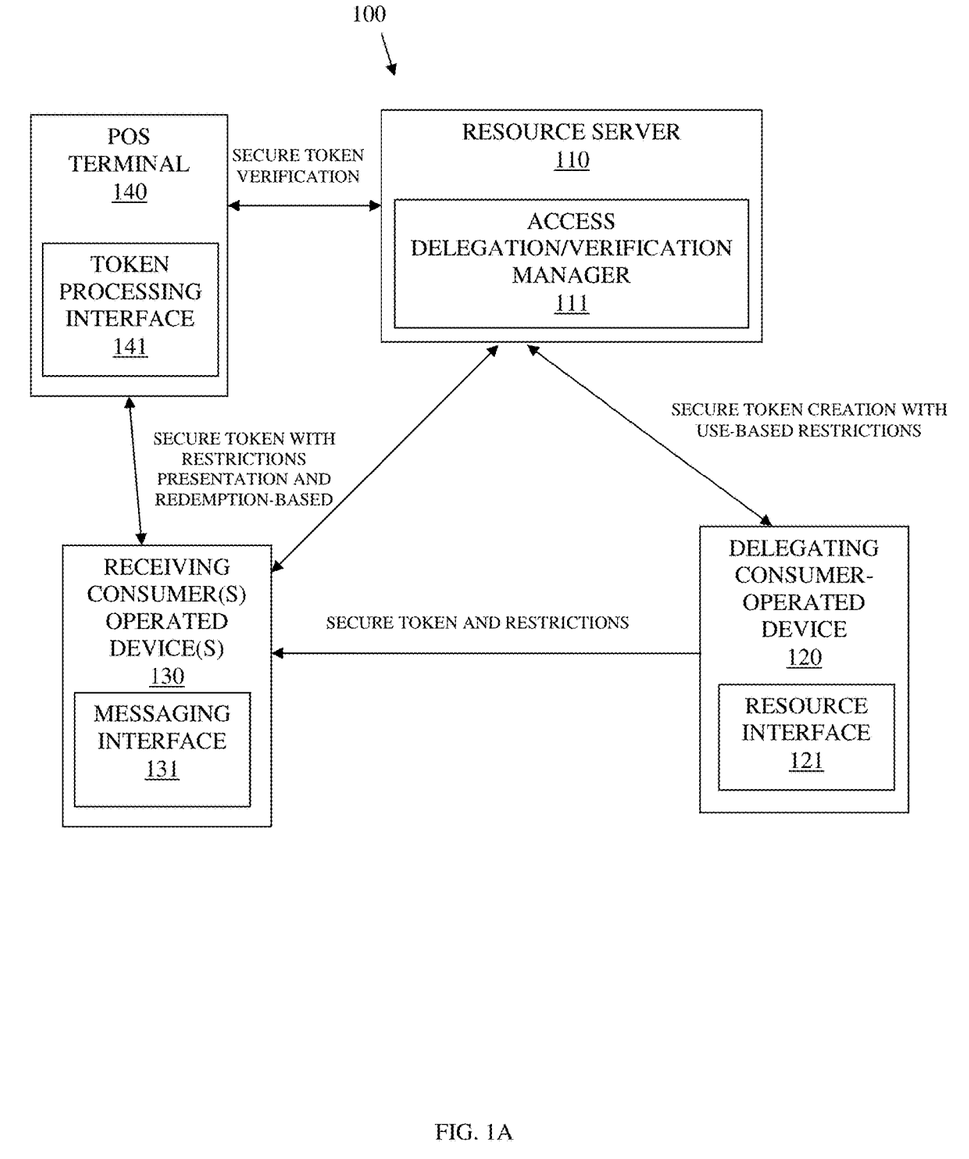
FIG. 1A is a diagram illustrating components of a secure access-based resource delegation system, according to an example embodiment.

FIG. 1A is a diagram illustrating components of a secure access-based resource delegation system 100, according to an example embodiment. It is to be noted that the secure access-based resource delegation system 100 is shown schematically in greatly simplified form, with only those components relevant to understanding of the embodiments being illustrated.

Furthermore, the various components (that are identified in the FIG. 1A) are illustrated and the arrangement of the components is presented for purposes of illustration only. It is to be noted that other arrangements with more or less components are possible without departing from the teachings of token-based security processing, presented herein and below.

Furthermore, the techniques and the systems presented herein and below (for secure access-based resource delegation) may include all or some combination of the components shown with the system 100. The methods are programmed as executable instructions in memory and/or non-transitory computer-readable storage media and executed on one or more processors associated with the components/devices.

Specifically, the system 100 includes a resource server 110 (having an access delegation/verification manager 111), a delegating consumer-operated device 120 (having a resource interface 121), one or more receiving consumer operated devices 130 (each such device 130 having at least one messaging interface 131), and a Point-Of-Sale (POS) terminal 140 (having a token processing interface 141).

As used herein a 'resource' includes a secure asset held by a delegating consumer. In an embodiment, the secure asset includes: any type of financial account and/or electronically held accounts by the delegating consumer, which may be unrelated to finances, such as private data, loyalty programs, social media, retail accounts, and the like.

A "delegating consumer" is a user that is securely delegating access to one or more third-parties for access to one or more of the delegating consumer's resources.

A "third-party" or "receiving consumer" is a user that receives delegated and secured access to a delegating consumer's resource(s). It is to be noted that once a particular receiving consumer receives a secure token for secure access to a delegating consumer's resource(s) that in some situations the receiving consumer can become a delegating consumer (assuming the use-based restrictions on the secure token do not prohibit such further sub delegation by a receiving consumer); this occurs when a receiving consumer delegates the secure token to a different receiving consumer.

A "secure token" is a piece of information that minimally identifies the delegating consumer (delegating consumer identifier) and the resource of the delegating consumer (resource identifier), and perhaps, the receiving consumer (receiving consumer identifier). The information can be encoded (such as in a barcoded or Quick Response (QR)

code format); embedded within a Uniform Resource Locator (URL) link; embedded in a document to be transported to a third-party. The secure token can contain a URL or access mechanism to the resource server 110 that allows the third-party to validate the token or to further delegate the token.

The "use-based restrictions" or "caveats" are conditions associated with the secure token that are defined by the delegating consumer from device 120 using the resource interface 121. The caveats are dynamically evaluated at the time of access based on information provided with the access, such as receiving consumer's identifier, POS terminal identifier for the POS terminal 140, calendar date, day of week, time of day, currency amount of the access transaction, receiving consumer's operated device identifier for the receiving consumer's operated device 130, retailer identifier associated with the POS terminal 140, retailer category associated with a grouping or type of retailer associated with the POS terminal 140, item identifiers for any items associated with the access transaction, and/or other configured and predefined data types available from the receiving consumer's operated device 130 and/or available from the POS terminal 140. The types of information provided during access can be represented as variables within the conditions defined in the caveats; the conditions organized in statements that result in an action, such as authorized or unauthorized. The conditions defined in the statement of the caveats can also request that some additional information be obtained from the receiving consumer during the access transactions, such as a notice to an operator of the POS terminal 140 to obtain and verify a government issued identification card of the receiving consumer and verify that it is a particular name or please request the receiving consumer to enter a Personal Identification Number (PIN), and the like. In some cases, a caveat may require an operator (clerk) of the POS terminal 140 verify that a task or action has been completed by a system/automated software service; or a caveat may provide the POS terminal 140 with enough information so that the POS terminal 140 may query the system/automated software service automatically (such as through an URL to a service Application Programming Interface (API) that the other system exposes in an automated fashion.

The caveats organized as statements form a type of access contract between the delegating consumer and the receiving consumer and defining how the access transaction is to be authorized at the time of the access transaction. In an embodiment, the semantic and syntactical structure of the caveats organized as logical statements is a macaroon cookie that is a secure cookie utilizing Key-Hashed Message Authentication Code (HMAC) encryption algorithms for non-repudiation (verification when the secure token is processed for access by the receiving consumer, such that the receiving consumer cannot repudiate the access transaction). This provides verifiable tracking and auditing information regarding use of the secure token to the owner of the resource server 110 and the delegating consumer.

In an embodiment, the secure token with the caveats are encoded together as a single barcoded image and/or QR token.

In an embodiment, the caveats are included in the secure token. Here, the token and caveats form a single data structure, such that the information defined above as being in the token are separate caveats.

In an embodiment, the token and caveats are a macaroon cookie using HMAC.

The process by which the receiving consumer utilizes or attempts to utilize the secure token for access to the resource is referred to here is as the "access transaction," "redemption," and/or "token redemption."

The caveats can define a single use secure token redemption or on-going multiple redemptions for the secure token until a caveat defined termination of the secure token.

During operation, the delegating consumer operates device 120 to authenticate to an enterprise (such as a bank) that controls and maintains access to the delegating consumer's resource (such as a financial account). The consumer interacts with the resource interface 121 (may also be a web page hosted by the resource server and rendered on device 120) to create a secure token linked to the resource and to user-define caveats on secure token redemption). The created secure token with caveats is provided back to the delegating consumer on device 120.

The delegating consumer then uses device 120 to send the secure token with caveats to a receiving consumer, which is received by the receiving consumer through a messaging interface 131 on device 130 (operated by the receiving consumer). The secure token with caveats can be sent from device 120 to device 130 through Short Messaging Service (SMS) text, email, Near Field Communication (NFC) tap, social media messaging, instant messaging, barcode scan, and/or QR scan.

The receiving consumer then operates device 130 to present or deliver the secure token with restrictions to either a POS terminal 140 or directly to the enterprise and resource server 110 for purposes of redeeming the secure token. In some cases, the receiving consumer can add additional caveats to the secure token once received from the original delegating consumer. That is, the receiving consumer has control over the received secure token (unless a caveat in the secure token prohibits such control) and can create more restrictive secure tokens with the more restrictive caveats that can then be delivered to one or more subsequent receiving consumers (in this case, the original receiving consumer becomes a sub-delegating consumer when modifying the original secure token to create one or more additional new and sub secure tokens that are then distributed to one or more additional receiving consumers). The receiving consumer cannot create a less restrictive (broader) secure token with less restrictive (broader) caveats from the original secure token with original caveats provided by the original delegating consumer.

In an embodiment, the receiving consumer displays the secure token with caveats on a display of the device 130 as a QR code. A scanner of the POS terminal 140 scans and decodes the secure token with caveats using the token processing interface 141. In an embodiment, the token processing interface 141 displays the caveats in a readable format to a clerk operating the POS terminal 140. The clerk then verifies the caveats and the token processing interface 141 presents the token to the access delegation/verification manager 111 for redemption of the token (such as payment for goods or service at a retailer associated with the POS terminal). In this latter embodiment, and in another embodiment, the retailer associated with the POS terminal 140 may perform redemption through the resource server 110 at the time of redemption or at a subsequent time, such as end of day where a variety of other redemptions are batched for processing (assuming the caveats of the secure token does not prohibit redeeming the token within a predefined time frame after presented for redemption to the POS terminal 140). In an embodiment, the interaction between the token processing interface 141 and the access delegation/verification manager 111 permits the access delegation/verification manager 111 to interactively and in real time verify the secure token with the POS terminal 140 during the redemption and redeem the secure token.

In an embodiment, the receiving consumer can deliver the secure token with caveats from device 130 to the POS terminal 140 using any of the techniques discussed above for the delegating consumer to deliver the secure token to the receiving consumer.

In an embodiment, the POS terminal 140 is a Self-Service Terminal (SST), such as an Automated Teller Machine (ATM). The receiving consumer scans the barcoded secure token with caveats, the ATM verifies or authenticates the caveats and performs a withdrawal of a predefined amount of money from a bank account (resource) of the delegating consumer and dispenses cash to the receiving consumer from the ATM.

In an embodiment, the transfer of the secure token with caveats from the device 130 to the POS terminal 140 occurs through a Near Field Communication (NFC) tap.

Example processing scenarios for the secure access-based resource access system 100 are now discussed. It is noted that other scenarios besides what is described below can be achieved using the components of the system and the processing. Therefore, these example scenarios are not intended to limit various embodiments of the invention.

Figure 1B:
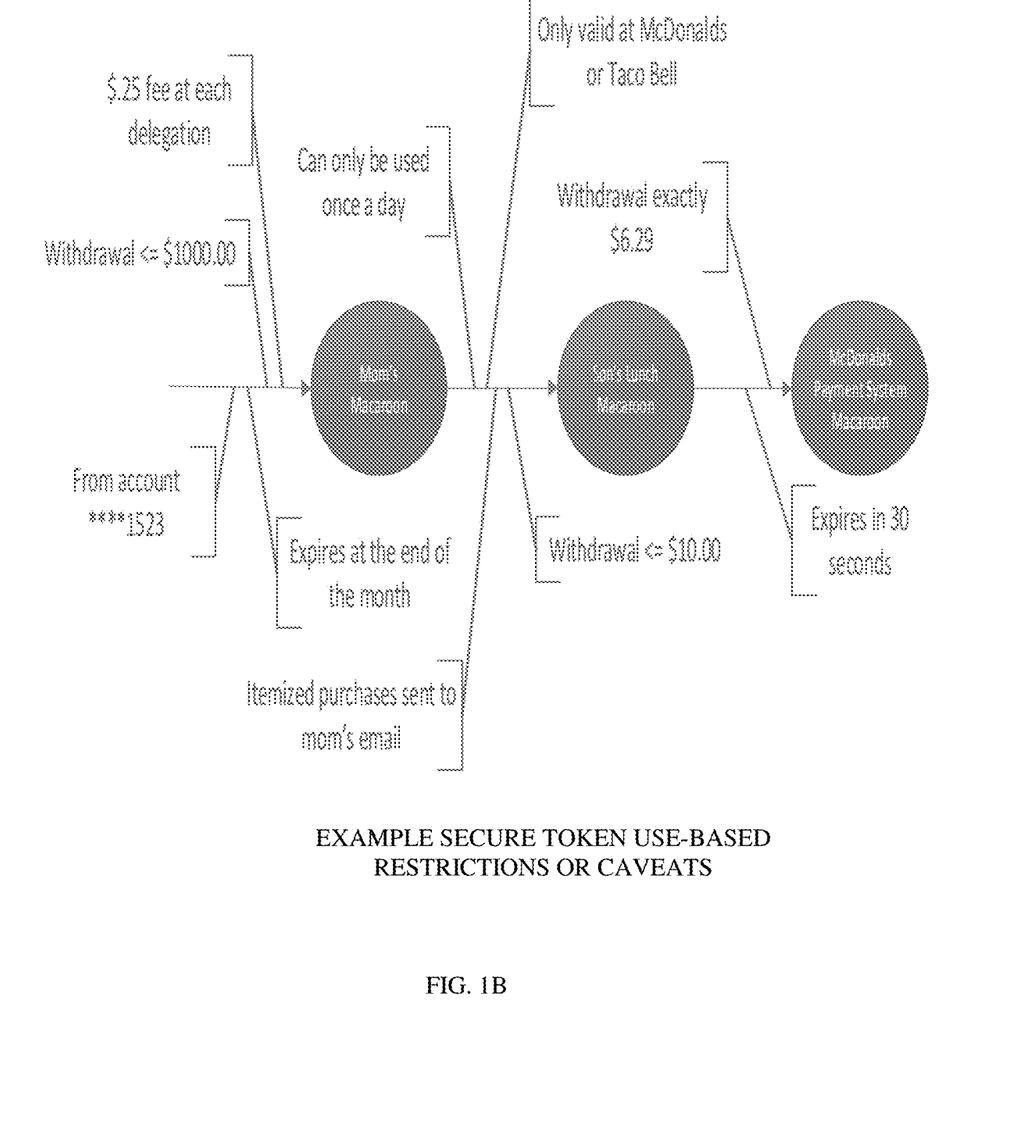
FIG. 1B is a diagram illustrating some example user-defined access-based restrictions/caveats, according to an example embodiment.

FIG. 1B is a diagram illustrating some example user-defined access-based restrictions/caveats, according to an example embodiment. A variety of these example caveats are used in describing the example processing scenarios.

In the example scenarios that follow, the resource server 110 is controlled and operated by a financial institution such as a bank or credit card company. The resource is a bank account owned or a credit account by a user (delegating consumer).

Noah is a teenager that needs funds for lunch daily. Noah is not very prudent in managing a weekly or monthly allowance for lunch. Noah's mom operates a tablet, personal computer, or mobile phone (device 120) accesses her bank (resource server 110) and sets up secure token that authorizes Noah to receive $10 each weekday (Monday-Friday) between 10 a.m. and 3 p.m. through a bank branch or at an ATM (POS terminal 140). Mom then sends or the bank (110) sends the newly created secure token with caveats to Noah's mobile phone (device 130). Noah receives a messaging asking him where he can get the $10 (a bank or the ATM 140), Noah selects ATM 140, which modifies the caveats (an example where the receiving consumer can add, change, or select some initially created caveats by the delegating consumer). Noah, then goes to an ATM 140 at noon on a Monday and scans the secure token with caveats at the ATM 140. The ATM 140 through the token processing interface 141 and the backend bank server 110 having the access delegation/verification manager 111 verifies that the time of redemption was between 10 a.m. and 3 p.m. and the day of the week is Monday-Friday; authorizes the transaction (redemption); debits the mom's bank account by $10; and dispenses $10 from the ATM 140 to Noah.

Dotty is an 83-year old grandmother and mother. Here health has been on the decline and she now lives in assisted living. She has no family that lives near the assisted living. She needs groceries once a week but she lacks access to an ATM to get cash on the needed bases to pay someone and she does not trust anyone to withdraw the cash for her. She also does not trust anyone with access to her credit card. An employee of the assisted living tells Dotty he will get her groceries once a week. Dotty uses her phone 120 and the resource interface 121 to set up a secure token to access her bank account with the caveats that funds can only be withdrawn at a grocery store, once a week, and for less than $100. Dotty receives from the access delegation/verification manager 111 the secure token with caveats and performs a phone 120 to phone 130 NFC tap with the employee. The employee goes to the grocery store once a week, presents the secure token with caveats to a POS terminal 140 operated by a clerk or to a Self-Service Terminal (SST) 140 when checking out. The token processing interface interacts with the access delegation/verification manager 111 debits Dotty's bank account (resource and assuming less than $100) and the employee delivers the groceries to Dotty.

Bob is a beleaguered and busy building contractor and single father of three. He needs someone to get a building permit and supplies on Tuesday (a day he is particular busy). Bob uses his phone to create a secure token with caveats that is good only for Tuesday for two separate transactions, one for a building permit and one for supplies and provides to his building manager Anne (in the manners and with the interactions described above). Anne can only get the building permit because she has to be on the building site to manage the electrician. Anne, delegates the supplies (modification by further delegation) to Steve. Anne uses the secure token with modified caveats to get the building permit while Steve uses the sub-delated secure token with modified caveats to get the supplies. When the two secure tokens with modified caveats are redeemed by Anne and Steve, Bob's line of credit with his lender is debited appropriately. This illustrates that the receiving consumer may be authorized to further delegate and modify the existing secure token with caveats such that the receiving consumer becomes a delegating consumer. Here, the messaging interface 131 may permit such modifications against the original secure token with caveats that Anne received and the original secure token with caveats may have either specifically authorized the delegation and modification or may have not specifically prohibited such delegation and modification.

Justin is in a location where there are no ATMs but there is a Western Union®. He needs cash to purchase something that he really wants but lacks the cash. Justin uses his phone to create a secure token with caveats to redeem at the Western Union and goes into the Western Union® where he presents the token with caveats. Justin receives the cash and purchases the desired item. This is an instance where the original delegating consumer creates a secure token with caveats such that the receiving consumer (redeeming consumer) of the secure token is that same individual that owns the resource. So, in some embodiments, the delegating and receiving consumer are the same individual.

Joseph owes John and Eric each $50 for gift they all went in on for a fellow employee. Joseph keeps forgetting cash and John and Eric are getting perturbed. Joseph creates a single secure token having multiple usage restrictions (caveats) for $50 each to debit his bank account and delivers the secure tokens to John and Eric. The caveats include no expiration date. John and Eric are free at their leisure to go to the ATMs of their choice and scan the secure token with caveats and receive their $50 that Joseph owes them.

In an embodiment, the secure token with caveats can include processing for deducting service/redemption/transaction fees by the entity that controls the resource server 100 on redemption.

In an embodiment, the resource server 110 is a third-party cloud server that is trusted and processes the secure token with caveats processing on behalf of an enterprise that controls the resource of the delegating consumer.

In an embodiment, the original delegating consumer can interact with the interface 111 (through interface 121) at any time that precedes redemption of the secure token and revoke the secure token or mark the entire secure token invalid. This prevents the secure token from being redeemed. This can be accomplished by, as one example, adding a caveat in the original secure token that checks to make sure at the time of redemption that the secure token has not been revoked or marked invalid.

In an embodiment, the original delegating consumer can interact with the interface 111 (though interface 121) at any time that precedes complete redemption of the secure token and add additional and new caveats on any unredeemed portion of the secure token. This can be accomplished by, as one example, adding a caveat in the original secure token that checks for any updates made to the secure token at the time of redemption.

In an embodiment, the original secure token can include caveats that are directed to the redeeming party, such as the POS terminal 140. Once such caveat was discussed above that incorporates a time within which the redeeming party must redeem the secure token once the secure token is presented for redemption.

These and other embodiments are now discussed with reference to the FIGS. 2-4.

Figure 2:
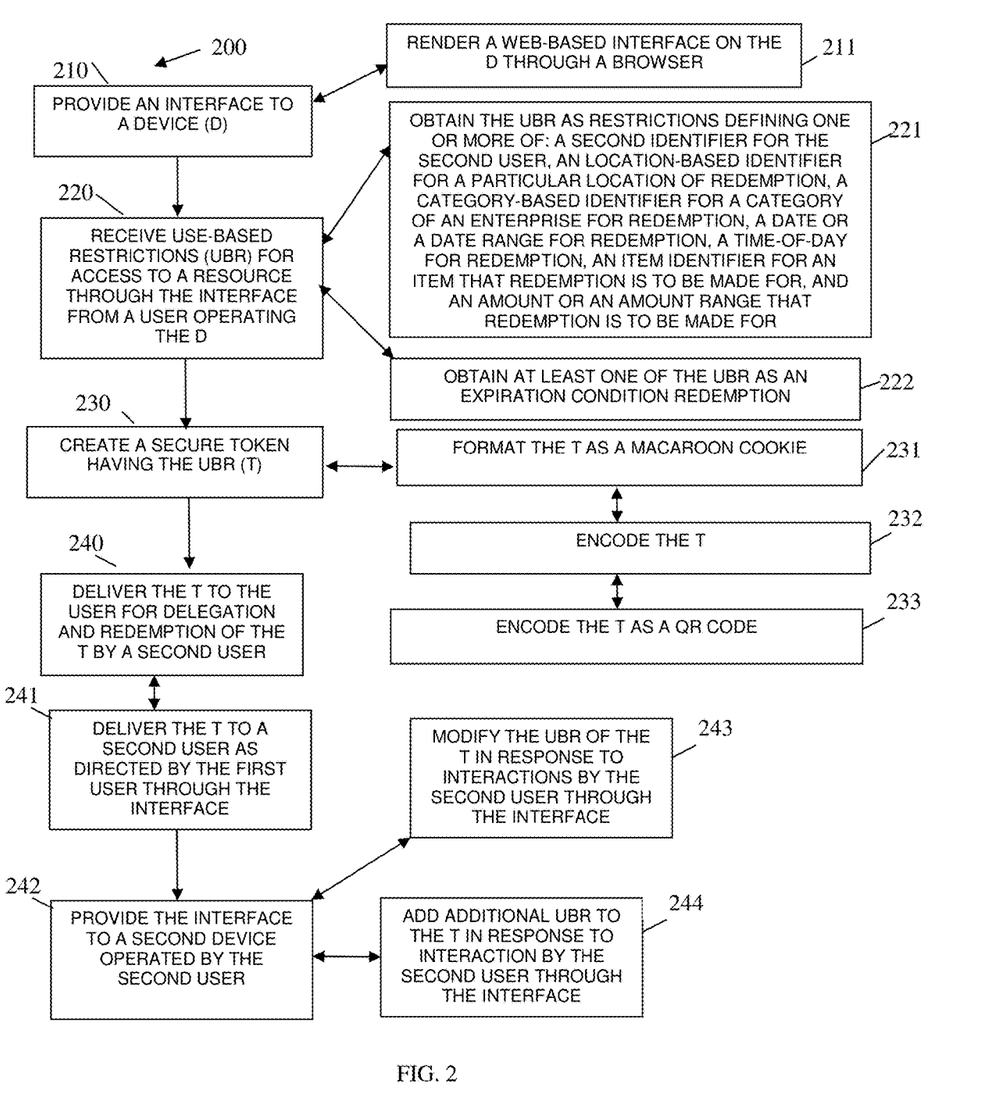
FIG. 2 is a diagram of a method for secure access-based resource delegation, according to an example embodiment.

FIG. 2 is a diagram of a method 200 for secure access-based resource delegation, according to an example embodiment. The software module(s) that implements the method 200 is referred to as a "resource delegation manager." The resource delegation manager is implemented as executable instructions programmed and residing within memory and/or a non-transitory computer-readable (processor-readable) storage medium and executed by one or more processors of a device. The processor(s) of the device that executes the resource delegation manager are specifically configured and programmed to process the resource delegation manager. The resource delegation manager has access to a network during its processing. The network can be wired, wireless, or a combination of wired and wireless.

In an embodiment, the device that executes the resource delegation manager is the resource server 100.

In an embodiment, the device that executes the resource delegation manager is a financial institution that controls a financial account (resource) of a consumer/user.

In an embodiment, the device that executes the resource delegation manager is a third-party server or a cloud server that interacts on behalf of a financial institution that controls a financial account (resource) of a consumer/user.

In an embodiment, the resource delegation manager is the access delegation/verification manager 111.

At 210, the resource delegation manager provides an interface to a device operated by a first user (the delegating user).

According to an embodiment, at 211, the resource delegation manager renders a web-based interface on the device through a browser.

In an embodiment, the interface is the interface 121.

In an embodiment, the device is the device 120.

At 220, the resource delegation manager receives use-based restrictions for access to a resource through the interface from a user who is operating the device. In an embodiment, the resource is a financial account owned by the user.

In an embodiment, at 221, the resource delegation manager obtains the use-based restrictions as restrictions that define one or more of: a second identifier for a second user, a location-based identifier for a particular location of redemption, a category-based identifier for a category of an enterprise for redemption, a date or date range for redemption, a time-of-day for redemption, an item identifier for an item that redemption is to be made for, and/or an amount or an amount range that redemption is to be made for.

In an embodiment, at 222, the resource delegation manager obtains at least one of the use-based restrictions as an expiration condition for redemption.

In an embodiment, the use-based restrictions include any of the use-based restrictions identified above in the FIGS. 1A-1B and/or any of the use-based restrictions identified at 221.

At 230, the resource delegation manager creates a secure token having the use-based restrictions.

In an embodiment, at 231, the resource delegation manager formats the secure token as a macaroon cookie.

In an embodiment of 231 and at 232, the resource delegation manager encodes the secure token.

In an embodiment of 232 and at 233, the resource delegation manager encodes the secure token as a QR code.

At 240, the resource delegation manager delivers the secure token to the user for delegation and redemption of the secure token by a second user.

In an embodiment, at 241, the resource delegation manager delivers the secure token to a second user as directed by the first user through the interface.

In an embodiment of 241 and at 242, the resource delegation manager provides the interface (another processing instance) to a second device operated by the second user.

In an embodiment of 242 and at 243, the resource delegation manager modifies the use-based restrictions of the secure token in response to interactions by the second user through the interface.

In an embodiment of 242 and at 244, the resource delegation manager adds additional use-based restrictions to the secure token in response to interaction by the second user through the interface.

Figure 3:
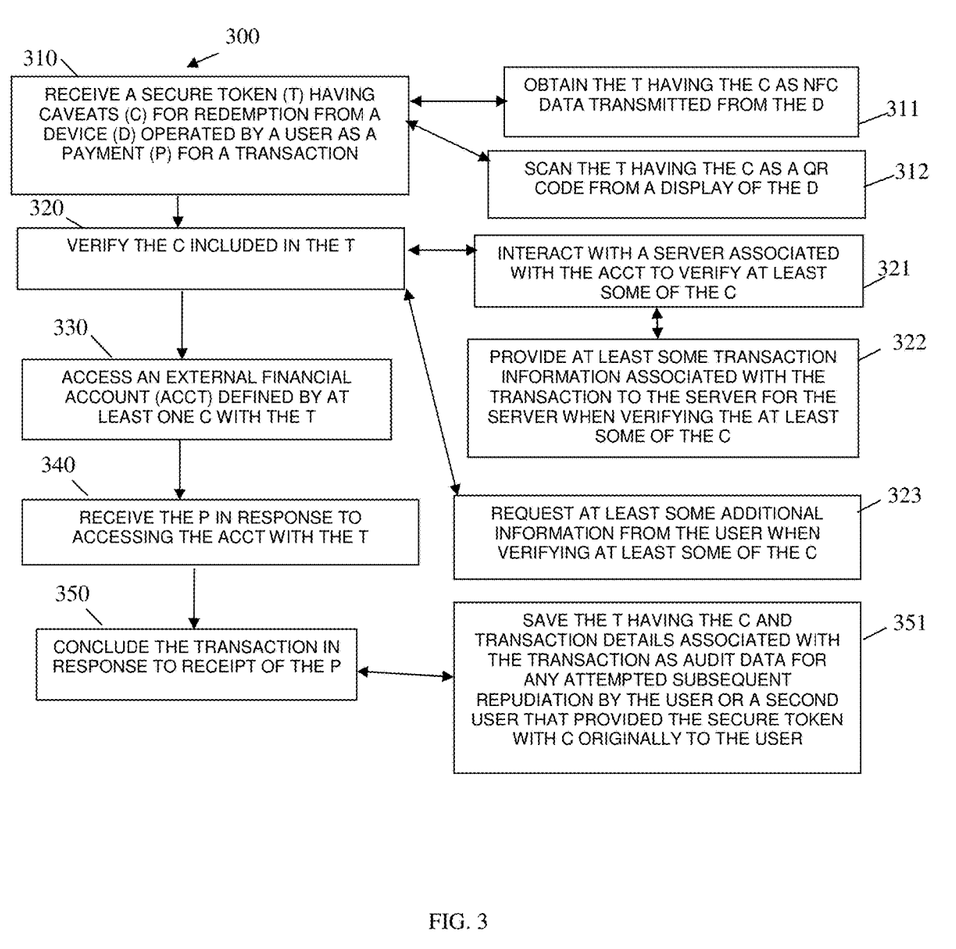
FIG. 3 is a diagram of another method for secure access-based resource delegation, according to an example embodiment.

FIG. 3 is a diagram of another method 300 for secure access-based resource delegation, according to an example embodiment. The software module(s) that implements the method 300 is referred to as an "resource access redemption manager." The resource access redemption manager is implemented as executable instructions programmed and residing within memory and/or a non-transitory computer-readable (processor-readable) storage medium and executed by one or more processors of a hardware device. The hardware processors that execute the resource access redemption manager are specifically configured and programmed to process the resource access redemption manager. The resource access redemption manager has access to one or more networks during its processing. Each network can be wired, wireless, or a combination of wired and wireless.

In an embodiment, the device that executes the resource access redemption manager is the POS terminal 140. In an embodiment, the POS terminal 140 is a SST. In an embodiment, the POS terminal 140 is an ATM. In an embodiment, the POS terminal 140 is a kiosk.

In an embodiment, the resource access redemption manager is the token processing interface 141.

In an embodiment, the resource access redemption manager redeems a secure token for access to a resource that is created and distributed by the method 200 of the FIG. 2.

At 310, the resource access redemption manager receives a secure token having caveats for redemption from a device operated by a user as a payment for a transaction.

In an embodiment, the user is the receiving user discussed above in the FIGS. 1A-1B and the device is the device 130. The user receives the secure token with the caveats from a delegating user or from the method 200. The manner in which the delegating user provides the secure token to the user and the device can be through any messaging based interface as discussed above in the FIGS. 1A-1B. Moreover, the secure token is originally created through interactions of the delegating user with the method 200 and/or the resource server 110.

According to an embodiment, at 311, the resource access redemption manager obtains the secure token having the caveats as NFC data transmitted from the device.

In an embodiment, at 312, the resource access redemption manager scans the secure token having the caveats as a QR code from a display of the device.

At 320, the resource access redemption manager verifies the caveats included in the secure token.

In an embodiment, at 321, the resource access redemption manager interacts with a server associated with the external financial account (discussed at 330) to verify at least some of the caveats.

In an embodiment of 321 and at 322, the resource access redemption manager provides at least some transaction information associated with the transaction to the server for the server when verifying at least some of the caveats.

In an embodiment, at 323, the resource access redemption manager requests at least some additional information from the user when verifying at least some of the caveats, the type of additional information provided in the caveats.

In embodiments 321-323, the server is the server 110 of the FIGS. 1A-1B and/or the server that processes the method 200 of the FIG. 2.

At 330, the resource access redemption manager accesses an external financial account (resource) defined by at least one of the caveats included with the secure token.

At 340, the resource access redemption manager receives the payment for the transaction in response to accessing the external financial account with the secure token.

At 350, the resource access redemption manager concludes the transaction in response to receipt of the payment.

In an embodiment, at 351, the resource access redemption manager saves the secure token having the caveats and transaction details associated with the transaction as audit data for any attempted subsequent repudiation by the user or a second user that provided the secure token with the caveats originally to the user.

In an embodiment, the external financial account is not owned by or controlled in any manner by the user. That is a different user provided the secure token and caveats to the user for accessing that user's external financial account.

Figure 4:
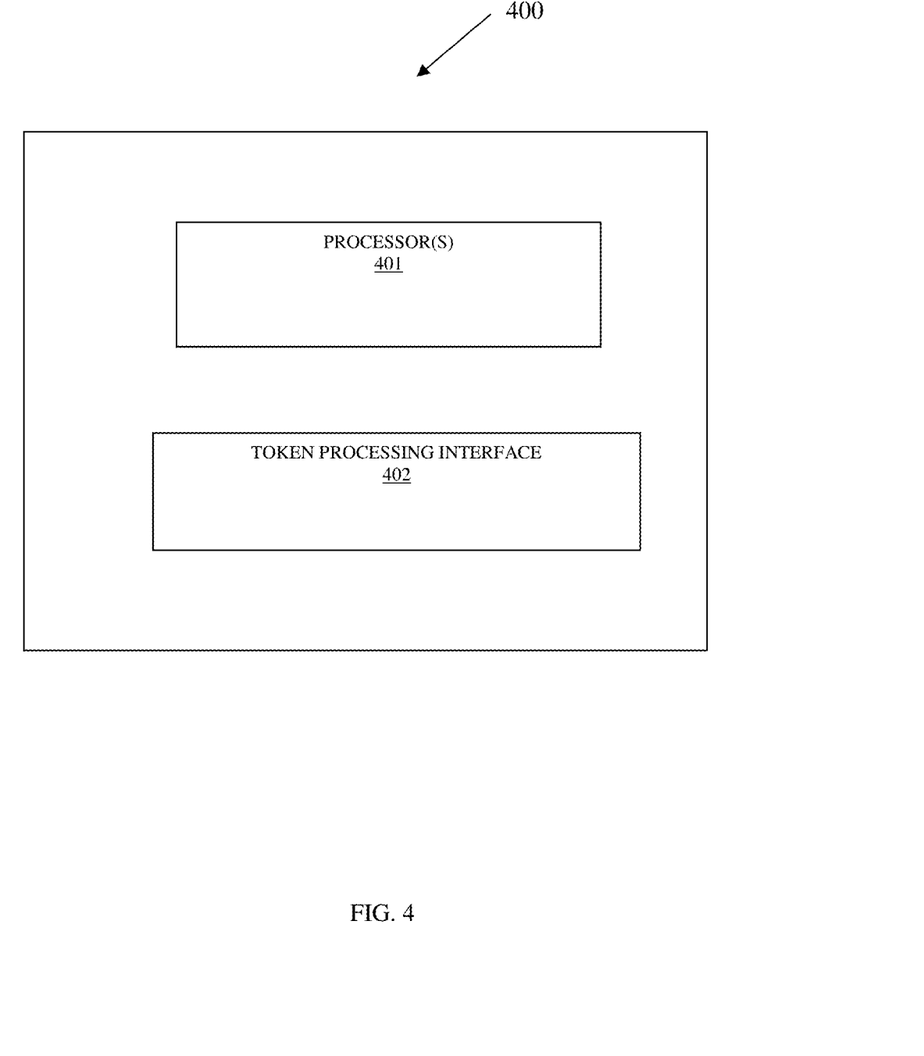
FIG. 4 is a diagram of a POS terminal, according to an example embodiment.

FIG. 4 is a diagram of a POS terminal 400, according to an example embodiment. Some components of the POS terminal 400 are programmed and reside within memory and/or a non-transitory computer-readable medium and execute on one or more hardware processors of the POS terminal 400. The POS terminal 400 communicates over one or more networks, which can be wired, wireless, or a combination of wired and wireless.

In an embodiment, the POS terminal 400 is the POS terminal 140 of the FIG. 1A.

In an embodiment, the POS terminal 400 is a SST.

In an embodiment, the POS terminal 400 is an ATM.

In an embodiment, the POS terminal 400 is a kiosk.

In an embodiment, the POS terminal 400 is operated by a clerk on behalf of a consumer checking out of retail establishment.

In an embodiment, POS terminal 400 implements, among other things, some the processing discussed in the FIGS. 1A, 1B, and 3.

The POS terminal 400 includes a processor 401, and a token processing interface 402.

The token processing interface 402 is configured to: 1) execute on the one or more processors 401; 2) receive a secure token with caveats from a user operating a device; 3) verify the caveats; 4) obtain a payment for a transaction with the user from a resource defined in the secure token; and 5) conclude the transaction when the payment is received.

In an embodiment, the token processing interface 401 is the token processing interface 141.

In an embodiment, the token processing interface 401 is the method 200 of the FIG. 2.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
providing, by executable instructions that execute on a hardware processor of a server from a non-transitory computer-readable storage medium, a device interface to a first device, wherein providing further includes rendering a web-based interface on the first device through a browser as the device interface;
authenticating, by the executable instructions, a first user for access to a resource owned by the first user;
providing the first user access to the resource based on the authenticating;
obtaining, by the executable instructions, restrictions, wherein the obtained restriction are use-based restrictions that define delegated access to the resource through the device interface from the first user operating the first device;
identifying a first portion of the use-based restrictions comprising a second identifier for a second user who is authorized by the first user;
identifying a second portion of the use-based restrictions comprise information that is required to be presented by the second user for redemption or access to the resource;

identifying the resource as a financial account of the first user and the first user is delegating the second user with access to the financial account of the first user subject to the use-based restrictions obtained for the first user through the device interface;

creating, by the executable instructions, a secure token comprising the use-based restrictions, as caveats that are expressed as conditions and organized in statements within the secure token and the statements define how an access transaction is authorized when the secure token is presented to access the financial account of the first user, wherein creating further includes generating the secure token with the caveats as a Key Hashed Message Authentication Code (HMAC);

delivering, by the executable instructions, the secure token to the first device of the first user for delegation and redemption of the secure token by the second user via a second device operated by the second user, wherein delivering further includes encoding the HMAC as a Quick Response (QR) code that is provided to the first device and that is provided from the first device to the second device via a scan of the QR code presented on a display of the first device for scanning by the second device and for subsequent redemption or access to the financial account by the second user using the QR code;

identifying a third-portion of the use-base restriction which allows further delegation of the secure token by the second user to a third user; and transferring the QR code from the second device of the second user to a third device of a third user for subsequent redemption or access to the financial account by the third user using the QR code.

2. The method of claim 1, wherein receiving further includes obtaining the use-based restrictions as restrictions defining one or more of:

an location-based identifier for a particular location of redemption, a category-based identifier for a category of an enterprise for redemption, a date or a date range for redemption, a time-of-day for redemption, an item identifier for an item that redemption is to be made for, and an amount or an amount range that redemption is to be made for.

3. The method of claim 1, wherein receiving further includes obtaining at least one of the use-based restrictions as an expiration condition redemption.

4. The method of claim 1, wherein delivering further includes delivering the secure token to the second user as directed by the first user through the device interface.

5. The method of claim 4 further comprising, providing the device interface to the second device operated by the second user.

6. The method of claim 5 further comprising, modifying the use-based restrictions of the secure token in response to interactions by the second user through the device interface.

7. The method of claim 5 further comprising, adding additional use-based restrictions to the secure token in response to interactions by the second user through the device interface.

* * * * *